United States Patent [19]

Mitchnick et al.

[11] Patent Number: 5,770,216

[45] Date of Patent: Jun. 23, 1998

[54] CONDUCTIVE POLYMERS CONTAINING ZINC OXIDE PARTICLES AS ADDITIVES

[76] Inventors: Mark Mitchnick, P.O. Box 1451, Wainscott, N.Y. 11975; Mamoun Muhammed, Eketorpsvägen 25, S-18261 Djursholm-(Stockholm), Belgium

[21] Appl. No.: 442,643

[22] Filed: May 17, 1995

Related U.S. Application Data

[63] Continuation of Ser. No. 54,848, Apr. 28, 1993, abandoned.

[51] Int. Cl.$^6$ ................................................. B32B 27/18
[52] U.S. Cl. ........................... 428/402; 428/407; 428/447; 428/473.5; 428/521; 428/523; 428/913; 524/80; 524/401; 524/432
[58] Field of Search ................................... 428/323, 328, 428/332, 402, 403, 407, 447, 473.5, 521, 523, 913; 252/500, 518; 524/80, 401, 432

[56] References Cited

U.S. PATENT DOCUMENTS

| | | | |
|---|---|---|---|
| 2,898,191 | 8/1959 | Conn et al. ............................. | 423/622 |
| 2,900,244 | 8/1959 | Bradstreet et al. ..................... | 75/359 |
| 3,397,257 | 8/1968 | Brambilla et al. ..................... | 56/364 |
| 3,639,162 | 2/1972 | Bixler ..................................... | 117/215 |
| 3,754,909 | 8/1973 | Feltzin et al. .......................... | 96/1.5 |
| 3,972,715 | 8/1976 | Okumura ................................ | 96/1 R |
| 4,048,372 | 9/1977 | Ando et al. ............................ | 428/412 |
| 4,160,046 | 7/1979 | Okumura ................................ | 427/57 |
| 4,239,632 | 12/1980 | Baile ..................................... | 252/12 |
| 4,261,965 | 4/1981 | Fukuda et al. ......................... | 423/544 |
| 4,382,024 | 5/1983 | Seaman et al. ........................ | 252/511 |
| 4,418,117 | 11/1983 | Shaw ..................................... | 428/327 |
| 4,420,534 | 12/1983 | Matsui et al. .......................... | 428/372 |
| 4,457,973 | 7/1984 | Matsui et al. .......................... | 428/372 |
| 4,495,482 | 1/1985 | Philipp .................................. | 338/21 |
| 4,543,341 | 9/1985 | Barringer et al. ..................... | 501/1 |
| 4,571,361 | 2/1986 | Kawaguchi et al. ................... | 428/328 |
| 4,604,303 | 8/1986 | Takakura et al. ..................... | 427/229 |
| 4,606,869 | 8/1986 | Showak ................................. | 264/12 |
| 4,642,202 | 2/1987 | Railsback .............................. | 252/511 |
| 4,689,475 | 8/1987 | Kleiner et al. ........................ | 219/553 |
| 4,721,610 | 1/1988 | Yoshida et al. ....................... | 423/636 |
| 4,722,763 | 2/1988 | Pa et al. ................................ | 156/616.1 |
| 4,808,398 | 2/1989 | Heistand, II .......................... | 423/622 |
| 4,869,954 | 9/1989 | Squitieri ............................... | 428/283 |
| 4,876,777 | 10/1989 | Chow .................................... | 29/132 |
| 4,910,389 | 3/1990 | Sherman et al. ...................... | 219/548 |
| 4,923,518 | 5/1990 | Brand et al. ........................... | 106/429 |
| 4,971,727 | 11/1990 | Takahashi et al. .................... | 252/511 |
| 5,008,646 | 4/1991 | Hennings et al. ..................... | 338/20 |
| 5,026,594 | 6/1991 | Akao ...................................... | 428/220 |
| 5,091,765 | 2/1992 | Yoshinaka et al. ................... | 357/30 |
| 5,102,650 | 4/1992 | Hayashi et al. ....................... | 423/622 |
| 5,104,731 | 4/1992 | Gager .................................... | 428/323 |
| 5,106,653 | 4/1992 | Barma et al. .......................... | 252/511 |
| 5,132,104 | 7/1992 | Yamamoto et al. .................. | 423/419 P |
| 5,162,775 | 11/1992 | Kuramochi et al. ................. | 338/114 |
| 5,171,364 | 12/1992 | Sato et al. ............................ | 106/425 |
| 5,173,765 | 12/1992 | Nakayoshi et al. ................. | 257/783 |

*Primary Examiner*—H. Thi Le
*Attorney, Agent, or Firm*—Kathleen Madden Williams

[57] ABSTRACT

The invention features a conductive polymer comprising a polymer and zinc oxide particles having a substantially rod shape.

19 Claims, 5 Drawing Sheets

CONDUCTIVE POLYMERS CONTAINING ZINC OXIDE PARTICLES AS ADDITIVES

This application is a continuation of application Ser. No. 08/054,848, filed Apr. 28, 1993 now abandoned.

The invention relates to polymers containing additives which confer conductive and antistatic properties to the polymer.

BACKGROUND OF THE INVENTION

The incorporation of additives into polymers is known in the art. There has been extensive use of additives, such as antifog agents, antistatic agents, antioxidants, plasticisers, stabilizers, infra-red absorbers, biocides, flame retardants, non-ionic surfactants, etc., in polymer technology. Such additives may be in the form of, e.g., liquids, pastes, waxy low-melting solutions, or lubricants.

Plastics are electrically insulative and may generate and accumulate static electricity by contact or friction with a material or by being stripped from a material during production or use thereof. Optically transparent electrically conductive coatings are known in the art for use in display devices, photoconductive components, and solar photovoltaic cells. U.S. Pat. No. 4,571,361 discusses plastic films containing crystalline metal oxides. U.S. Pat. No. 4,048,372 discusses light transmissive, electrically conductive cadmium stannate films on plastic substrates.

Electrically conductive silicone rubber compositions are known for the manufacture of heating elements such as tapes and for manufacture of adhesives for bonding conductive elements. U.S. Pat. No. 4,382,024 discusses conductive silicone rubbers containing carbon black and other additives, which include metal particles. U.S. Pat. No. 5,173,765 discusses a conductive adhesive for bonding semiconductor pellets to tabs made from silicone rubber and a metal micropowder.

Objects of the invention include the following. One object is to provide conductive polymers made from any one of a variety of polymer substrates for use where electrostatic charges are undesired. Another object is to provide substantially transparent antistatic plastic films. Another object of the invention is to provide antistatic rubber compositions which are stable and easy to handle during manufacture, and with reproducible conductive properties. Yet another object of the invention is to provide optically transparent and electrically conductive coatings for deposition onto glass or plastic substrates to confer antistatic properties. Still another object of the invention is to provide conductive polymers which are antistatic by virtue of the presence in the polymer of zinc oxide particles. Zinc oxide particles useful in the invention are of dimensions which allow the particles to assume an end-to-end, side-by-side or criss-cross-packing arrangement, once the surface is coated with the polymer, such that there are relatively few gaps between the particles for loss of conductivity. Zinc oxide particles of the invention, because they are rod-shaped, have a high ratio of surface area to volume or weight. It is another object of the invention to provide a conductive polymer for coating a surface which possesses even spreadability over the surface. Further, it is an object of the invention to provide an antistatic, conductive polymer which is transparent, white, or of any desired color other than white.

The accumulation of static electrical charges on rubber articles often causes serious hazardous conditions to arise in that the electrical potential may become so great that a discharge of the electrical potential occurs in the form of a spark which then may ignite inflammable or explosive materials in the vicinity, or at least cause some discomfort to a person coming into contact therewith. To minimize the hazardous sparking caused by the instantaneous discharge of static electrical charges, rubbery bodies in which static electrical charges may develop should desirably be fabricated of a composition having a low electrical resistivity allowing static electricity formed therein to be (harmlessly) conducted to an electrical ground before an accumulation of static electrical charges occurs sufficient to cause a spark to form between two or more bodies.

SUMMARY OF THE INVENTION

It has been discovered that sufficient electrical conductivity can be obtained in polymers by the use of fine particles of zinc oxide which have a substantially rod shape, as described and defined herein. The invention is thus based on the discovery that zinc oxide rod-shaped particles confer antistatic properties to particle-containing polymers used in the manufacture of plastics, rubbers, lubricants, adhesives and any other article without affecting the color, appearance, or tactile properties of the resulting product.

The invention features a conductive polymer comprising a polymer in combination with zinc oxide particles having a substantially rod shape.

As used herein, "rod" refers to a zinc oxide particle having an aspect ratio (i.e., ratio of length/diameter) of at least two, preferably at least three; a length preferably less than 2000 nm, more preferably less than 300 nm, most preferably less than 200 nm; and a diameter preferably less than 1000 nm, more preferably less than 150 nm, most preferably less than 100 nm. Thus, an aspect ratio of two will include length/diameter dimensions of 2000 nm/1000 nm, 300 nm/150 nm, 200 nm/100 nm, and dimensions falling between or below these ratios. An aspect ratio of three will include length/diameter dimensions of 2000 nm/600 nm, 300 nm/100 nm, 200 nm/65 nm, and dimensions falling between or below these numbers. An aspect ratio of four or more will be determined accordingly; for example, an aspect ratio of four will have length/diameter dimensions falling below and including 2000 nm/500 nm. "Substantially rod shape" refers to an elongated spherical shape, e.g., having an aspect ratio of at least two, or a flattened rod-shape, such as the shape of a green bean. "Substantially spherical cross-section" refers to spherical or flattened spherical cross-sections (e.g., the cross-section of a bean).

The size and shape of the rod-shaped particles described herein provides an excellent surface area and allows for excellent contact between the particles, thus maximizing conductivity. The rod shape of the particles allows the particles to remain in contact even when the medium in which they are dispersed during manufacture of the polymer is thinned. Zinc oxide particles which are not rod-shaped tend to aggregate and clump upon thinning of the composition into which they are dispersed. This, in turn, dramatically reduces the conductive properties of a liquid containing such particles. It is preferable that the conductivity of a conductive polymer of the invention does not substantially diminish upon spreading of the composition on the surface. This may be achieved by including substantially rod-shaped zinc oxide particles in the polymer. "Evenly" or "uniformly dispersed", as used herein, is intended to mean that the rods do not form clumps within either the liquid or hardened form of the conductive polymer.

Compositions of the invention include zinc oxide particles having improved weight efficiency in that their rod shape allows them to assume relative particle orientations so as to maximize their conductive properties. For example, less zinc oxide (by weight) is needed in the rod-shaped form than in the spherical form to give equal or better conductivity. This is true because conductivity depends on particle/particle contact, which is largely a particle surface phenomenon, i.e., relatively less particle thickness is required relative to particle surface area. For example, spherical particles have a geometric shape which allows for single points of contact between particles. Thus, high concentrations of spheres are required to ensure continuous contacts between particles. Rod-shaped particles possess a geometric shape which allows for inter-particle contacts of the rods. Thus, conductive polymers of the invention provide a large surface area and require relatively less zinc oxide by weight for equivalent or better conductivity.

Another advantage of compositions of the invention is that the rod shape of the particles promotes an end-to-end, side-by-side or criss-cross-packing arrangement of the rods rather than the stacking or clumping tendency of crystals or spheres. Thus, conductive polymers of the invention provide a relatively even layer of zinc oxide, with consequent uniform conductivity within the polymer. As a result of this superior particle orientation, compositions of the present invention will be more evenly dispersed within a polymer. Rod shaped zinc oxide particles do not tend to agglomerate and thus will disperse evenly within the composition.

Other preferred embodiments include the following. The rod shaped particles may have a substantially spherical cross-section with an aspect ratio of at least two and preferably at least three. The zinc oxide particles of the invention may comprise from 1% to as much as 90% of the composition by weight, depending upon the desired thickness and color of the composition. More preferably, the zinc oxide rods comprise between 5% and 80% or 10% and 70%, or 20% and 60% of the composition; most preferably, between 30% and 50%.

The small size of the rod-shaped zinc oxide particles described herein provides another advantage in that these particles are essentially transparent to visible light. Thus, the presence of the rod-shaped particle imparts conductivity but does not affect the aesthetics of the finished product. The invention allows for production of colored as well as transparent products containing conductive polymers of the invention. The transparent quality is obtained by including in the polymer small rod-shaped particles, i.e., having a length of less than 300 nm and a diameter of less than 100–150 nm. Thus, the presence of the rod-shaped particle imparts conductivity but does not affect the aesthetics of the finished product. The invention allows for production of colored as well as transparent products containing conductive polymers of the invention. The transparent quality is obtained by including in the polymer small rod-shaped particles, i.e., having a length of less than 300 nm and a diameter of less than 100–150 nm. Thus, additives of any desired color may be used in a transparent polymer mixture to provide a polymerized product of a desired color. Larger particles, i.e., having a length longer than 300 nm and a diameter greater than 100–150 nm, are useful for polymers in which the opacity of the zinc oxide is an asset, e.g., white polymers, such as plastics, rubbers, adhesives, etc.

As used herein, "conductive" and "antistatic" refer to the ability to transmit electricity. Due to the improved inter-particle contact of zinc oxide rod-shaped particles, relatively less zinc oxide rod particles (wt/wt polymer) are required to give good conductivity. An undoped zinc oxide rod preparation with a particle size of about 150 nm length/50 nm diameter will possess a resistivity of approximately $1 \times 10^8$ ohm·cm when measured at 2000 pounds force in a 0.75 inch diameter cylinder. When the zinc oxide rod preparation is doped with aluminum, the resistivity will be approximately 100 ohm·cm.

As used herein, "conductive polymer" refers to any polymer which can be combinable with (i.e., binds together) substantially rod-shaped zinc oxide particles which are dispersed therein, the composition of which is antistatic and electrically conductive. Conductive polymers compositions and devices comprising them are described in U.S. Pat. Nos. 3,861,029; 4,177,376; 4,237,441; 4,315,237; 4,352,083; 4,413,301; 4,426,339; 4,642,202, 5,162,775, 4,604,303 and 4,459,473, all of which are hereby incorporated by reference. Organic polymers are preferred. "Polymer" refers to any material which can be polymerized by, e.g., irradiation, chemical or heat treatment, into a desired shape or consistency.

In preferred embodiments of the invention, the conductive polymer may include polymers which form plastic, e.g., monomers, oligomers and polymers, containing a vinyl or vinylidene group. Examples of such monomers containing a vinyl or vinylidene group include styrene and its compounds, e.g., α-methylstyrene and β-chlorostyrene, acrylic acid and methacrylic acid and their compounds, e.g., alkyl acrylate (alkyl group: containing 1 to 4 carbon atoms), alkyl methacrylate (alkyl group: containing 1 to 4 carbon atoms), glycidyl acrylate, glycidyl methacrylate, ethylene diacrylate, diethylene glycol diacrylate, ethylene dimethacrylate, glycerol trimethacrylate, pentaerythritol tetramethacrylate, aryl methacrylate, and aryl acrylate, vinyl acetate, acrylonitrile, methacrylonitrile, itaconic acid, maleic anhydride, acrylamido diarylphthalate, and diaryl fumarate.

Preferred examples of oligomers and polymers are compounds containing a double bond or bonds in the main chain thereof or compounds containing an acryloyl or methacryloyl group at both ends of the straight chain.

The invention also features a method of making a conductive polymer, which method includes the steps of: (a) combining a polymer with zinc oxide substantially rod-shaped particles, wherein the particles are formed by bringing into contact in an aqueous solution zinc ions, ammonium ions, and a carbonate source to form a precipitate, separating and optionally calcining the resultant precipitate to zinc oxide such that a metastable precipitate is formed in which the morphology and size of the particles is controlled by maintaining, during the precipitation: a temperature between 10° to 40° C.; a pH between 5 and 10; and wherein at least one of the zinc ion and carbonate source is progressively made available to the solution at a precipitation limiting rate; and (b) polymerizing the combined polymer. The resultant polymer will contain zinc oxide rods dispersed therein.

The polymer will preferably include an unsaturated bond capable of undergoing polymerization or a binder containing the polymerizable compound, providing the resulting dispersion on a plastic film to form at least one layer and polymerizing and curing the layer.

Zinc oxide rod shaped particles may be dispersed in the polymerizable compound as described above and then coated on a plastic film. Alternatively, they may be dispersed in a binder, and after addition of the polymerizable compound to the resulting dispersion, then coated on a plastic film. It is preferred that the zinc oxide particles are dispersed in the polymerizable compound.

Additional particulate fillers may be added to the zinc oxide rod/polymer mixture in order to alter the properties of the final composition or to further improve the dispersion during mixing. Particularly preferred are materials which tend to enhance the particle to polymer interaction and/or bonding. Such materials may be coupling or dispersing agents.

Any polymers normally used in coating can be used as the binder. Examples include cellulose esters, e.g., cellulose acetate, cellulose nitrate, cellulose acetate butyrate, and cellulose propionate, soluble polyesters, polycarbonates, soluble nylons, polyvinyl chloride, vinyl chloride-containing copolymers, polyvinylidene chloride, vinylidene chloride-containing copolymers, polystyrene, styrene-containing copolymers, polyvinyl acetate, vinyl acetate-containing copolymers, and alkyl acrylate-containing copolymers (alkyl group: containing 1 to 4 carbon atoms).

Solvents for these polymerizable compounds and these binders include ketones, e.g., acetone, methylethyl ketone, methyl isobutyl ketone, and cyclohexanone, ethers, e.g, methyl acetate, ethyl acetate, butyl acetate, ethyl-lactate, and acetic acid glycol monoethyl ether, glycol ethers, e.g., glycol dimethyl ether, glycol monomethyl ether, glycol monoethyl ether, and dioxane, aromatic hydrocarbons, e.g., benzene, toluene and xylene, chlorinated hydrocarbons, e.g., methylene chloride, ethylene chloride, chloroethylene, and trichloroethylene, alcohols, e.g., methanol, ethanol, propanol, and butanol, dimethylformamide, dimethylsulfonamide, and phenol.

Conductive polymers of the invention may have a resistivity of at least 100 ohm·cm, preferably at least 1000 ohm·cm, more preferably at least 10,000 ohm·cm, and most preferably at least 50,000–1,000,000 ohm·cm. High resistivities (e.g, greater than 10,000 ohm·cm) are preferred for certain uses. The resistivity of the zinc oxide rod particle preparation may be from $10^1$–$10^8$ ohm·cm, preferably $10^1$–$10^6$ ohm·cm, most preferably $10^1$–$10^5$ ohm·cm.

Conductive plastics of the invention are useful where static electricity creates a problem. Accumulated static electricity causes problems such as interference with functioning electric or magnetic components, such as in a computer or in the process of photographic exposure and development. In addition, static electricity causes dust to be attached to or to lie on the surface of a plastic film, and also may provide a strong electric shock to the user. In extreme cases, discharge occurs, causing combustion or ignition of inflammable substances. Static also can cause serious defects in photographic film. A conductive plastic of the invention may be manufactured as a substantially transparent plastic film which may be used as a wrapping, e.g., around computer casings, computer screens, and audio and visual recording materials; or as a support for photographic materials, electrophotographic materials, and magnetic films. In addition to comprising an antistatic surface layer, conductive plastics of the invention also may be integral plastic components, e.g, a computer casing itself, etc.

In other embodiments of the invention, the conductive polymer includes any elastomeric polymer which forms rubber, i.e., which has the property of extensibility and elastic recovery, i.e., the ability to be stretched to at least twice their original length and to retract very rapidly to approximately their original length when released. Rubbers are also cross-linkable; after cross-linking they possess and exhibit the properties normally associated with vulcanized rubber. Conductive rubbers useful in the invention may include but are not limited to silicone rubber or natural rubbers, and zinc oxide rod shaped particles dispersed therein. Silicone rubber may include silicone gum, methyl vinyl polysiloxane, or dimethyl vinyl polysiloxane.

Conductive zinc oxide rod-containing rubber polymers of the invention have the advantages of excellent stability, i.e., a lower rate of increase in electrical conductivity during storage prior to use; longer life, i.e., a lower rate of decrease in electrical conductivity during use, and thus a longer time for the composition to reach a predetermined minimum conductivity during use; a lower ratio of the switch-on current to the operating current; improved handleability of the material during manufacture since the addition reduces the stickiness of the material and at the same time the reduction in conductivity caused by introduction of the addition is relatively small; reproducible electrical properties of the composition in that different batches of the material which are of the same composition have substantially the same electrical properties.

A conductive silicone rubber composition of the invention has additional advantages of a lower overall material cost, an improved lifetime when used, for example, as a heating tape, water-proofing agent, shock absorbent, etc.; is easier to extrude; has a stable conductivity during mixing; maintains dimensional integrity during use; has flame retardant properties; can be molded, pressed, sheathed, calendered, extruded or subjected to any other process used in conventional rubber manufacture, with no significant loss of flexibility. The invention also features a method of making a conductive rubber polymer, comprising providing a rubber polymer, combining the polymer with zinc oxide particles having a substantially rod shape and made as described herein, and polymerizing the combined composition to form a conductive rubber.

In yet other embodiments of the invention, the conductive polymer includes any polymer which forms an adhesive, e.g., an epoxy resin, polyimide resin, silicone rubber resin, etc.

The invention also features a method of making a conductive adhesive, which method includes combining an adhesive-forming polymer with zinc oxide rods made as described herein, and polymerizing the polymer/rods to form a conductive adhesive.

Advantages and uses of conductive adhesives according to the invention include the following. Conductive zinc oxide-containing adhesives according to the invention may be particularly useful for as stress absorbers for relieving the internal strain originating in the differing thermal expansivities of the semiconductor pellet and tab. Zinc oxide-containing adhesives of the invention thus will help prevent cracking from developing in the semiconductor pellet or sealant resin that occurs during semiconductor pellet warming or heating during sealing with the sealing resin. Conductive adhesives according to the invention also do not result in a reduction in wire bondability, or a reduction in adhesiveness or moisture resistance.

In another embodiment of the invention, the conductive polymer includes any polymer which forms a lubricant and containing zinc oxide rod shaped particles dispersed therein. Examples of lubricant-forming polymers useful in the invention include but are not limited to lubricating compositions and shaped lubricating articles, which include 20–80% by weight of an oil of lubricating viscosity, e.g., mineral oil, diester oil or synthetic hydrocarbon oil. A shaped lubricating article is a substantially self-supporting article containing a high molecular weight polymer, made from, e.g., polyethylene or polymethylpentene in the range of about 1–5 million molecular weight, and containing 20–60% of an oil of lubricating viscosity dispersed therein.

The invention also features a method of making a conductive lubricant, comprising combining a lubricant-forming polymer with the zinc oxide, rod-shaped particles described herein.

The invention also features an electrical device which comprises an element composed of a conductive polymer comprising zinc oxide particles having a substantially rod shape, and at least one metal electrode having a surface which is in direct physical contact with the conductive polymer element.

Preferred conductive polymers for this aspect of the invention include those based on polyolefins, particularly high density polyethylene, and those based on fluoropolymers, particularly polyvinylidene fluoride.

Electrical devices comprising conductive zinc oxide rod-containing polymers of the invention include but are not limited to circuit protectors, particularly laminar devices having, e.g, a resistance of less than 100 ohms, particularly less than 1–25 ohms, self-limiting heaters, particularly flexible sheet heaters.

These and other properties of the invention will be understood by those skilled in the art from the description herein and from the claims.

DESCRIPTION

The invention encompasses polymers which possess electrically conductive and antistatic properties. Conductive polymer compositions of the invention include a continuous matrix which is a polymer, preferably organic, and zinc oxide particles having a substantially rod shape which are dispersed substantially uniformly throughout the polymer. The identity of the rod-shaped zinc oxide particles dispersed within the polymer matrix is maintained, i.e., the particles remain rod shaped and thus retain their ability to maintain good inter-particle contact when dispersed.

Conductive polymers of the invention may be useful as antistatic materials and as current-carrying components. They may exhibit what is known as PTC (positive temperature coefficient), ZTC (zero temperature coefficient) or NTC (negative temperature coefficient) behavior. The term "PTC behavior" is used to denote a composition which, in the operating temperature range of 0°–200° C. has an $R_{14}$ value of at least 2.5 or an $R_{100}$ value of at least 10, preferably both, and which preferably has an $R_{30}$ value of at least 6. $R_{14}$ is defined as the ratio of the resistivities at the end and the beginning of the 14° C. temperature range showing the greatest increase in resistivity. $R_{100}$ is the ratio of the resistivities at the end and the beginning of the 100° C. temperature range showing the greatest increase in resistivity. R30 is the ratio of the resistivities at the end and the beginning of the 30° C. temperature range showing the greatest increase in resistivity. The term "NTC behavior" is used to denote a polymer which does not show PTC behavior in the operating temperature range, and whose resistivity at 0° C. is at least 2 times, preferably at least 5 times, its resistivity at a higher temperature in the operating range. The term "ZTC behavior" is used to denote a polymer which does not show either PTC or NTC behavior. ZTC polymers can exhibit PTC behavior at temperatures above the operating temperature range of the polymer.

Conductive and antistatic polymers of the invention all contain zinc oxide particles having a substantially rod shape. By virtue of this rod shape, the particles maintain good inter-particle contact when dispersed within a polymer such that the polymers possess antistatic and conductive properties. Described below are methods for producing zinc oxide particles having a substantially rod shape which are useful in the conductive polymers of the invention, and drawings which show the process steps and electron micrographs of the particles. Also described below are methods of making and using conductive polymers of the invention, including methods of making and using conductive plastics, conductive rubbers, conductive adhesives, and conductive lubricants.

DRAWINGS

PREPARATION OF ZINC OXIDE RODS

Figure 1:
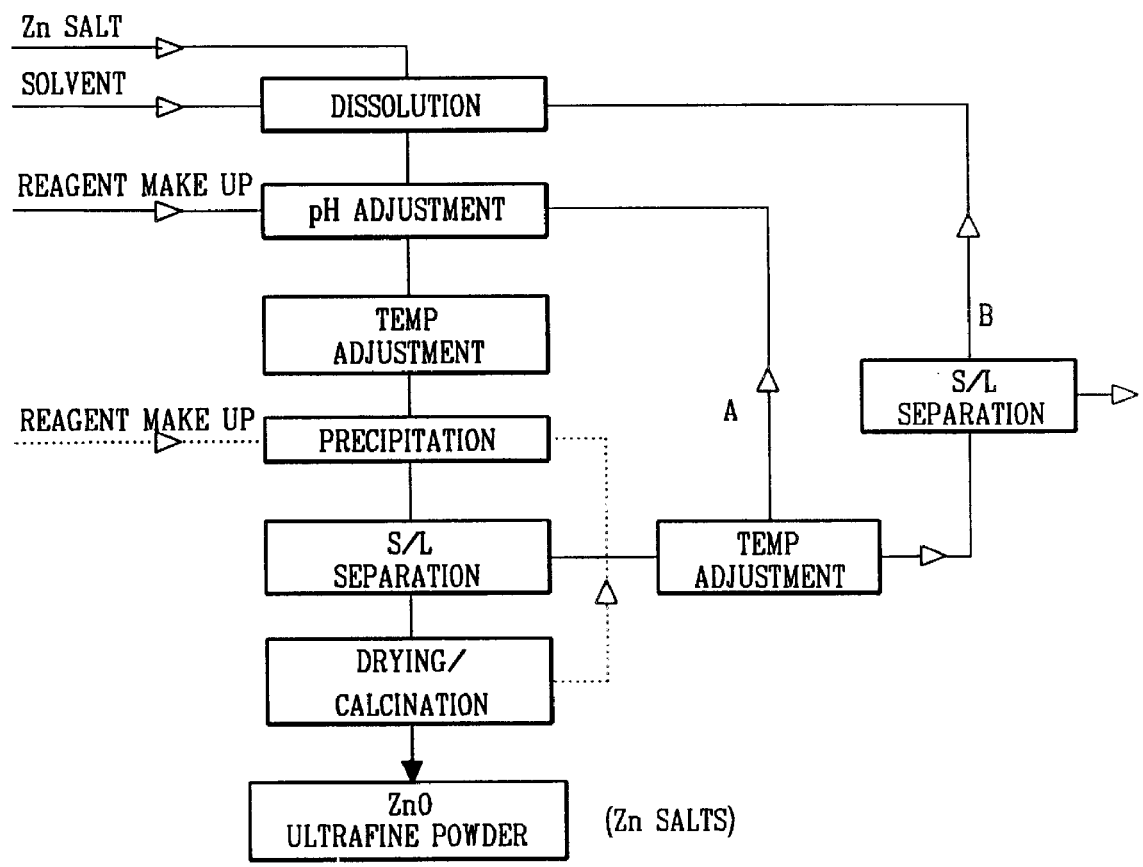
FIG. 1 is a flow diagram of a first process for producing the zinc oxide particles described herein.

Described below are methods of producing ultrafine zinc oxide, carbonates and oxalates with defined particle morphologies. Techniques for the production of such defined-morphology particles avoid the deficiencies of the prior art calcination or decomposition steps and are amenable to simultaneous or sequential co-precipitant doping.

Zinc oxide particles may be prepared in the form of rods in the size range 3 to 500 nm and even up to 10,500 nm in length, preferably 50–6,000 nm, more preferably 100–500 nm in length; a diameter of between 1 and 3,500 nm, preferably 10 and 2,000 nm, more preferably 100 and 150 nm and 10 to 150 nm in diameter, preferably about 50 to 150 nm, are most useful in the invention. The rods will generally have a circular cross section and comprise X-ray amorphous material. As used in this specification 'rods' have an aspect ratio of the order of at least 2–2.5, or at least 3, or more.

Typically, the particles will display a substantially homogenous size and aspect ratio distribution with micrographs of the rods showing greater than 75% and even up to 90% of the particles having a substantially similar size and aspect ratio. For instance, within a rod population of nominal aspect ratio 3 and diameter 100 nm, it is possible to produce populations in which 75% of the particles fall within an aspect ratio range of 2–4 and diameter range 50 to 150 nm.

Such zinc oxide particles with defined sizes and morphologies, including those produced by the techniques below, show interesting rheological properties.

As conductors, the controlled morphology particles of the invention can be used as fillers incorporated at conventional proportions into any type of polymer, e.g., plastics, rubbers, lubricants, adhesives, etc., to provide low specific volume resistance. Described and claimed in detail herein are polymers containing zinc oxide rods which are useful as static dispersants in polymers such as plastics and rubbers, etc. Particles with higher aspect ratios (e.g., 4–5) are generally preferred in these applications to enhance interparticle contact and thereby increase conductivity/unit weight. The Theological properties of the particles assure enhanced dispersability within the polymer. Polymers containing such rods will not exhibit the static electricity properties of polymers known in the art.

Also described herein in detail are methods for forming conductive polymers by combining a polymer with zinc oxide substantially rod-shaped particles, wherein the metastable precipitate is formed by bringing into contact in an aqueous solution zinc ions, ammonium ions and a carbonate source to form a precipitate, the resulting metastable precipitate is separated and optionally calcined to zinc oxide such that the morphology and size of the particles is controlled by maintaining, during precipitation: a temperature between 10° and 40° C., preferably 15° to 30° C. and more preferably 20° to 22° C.; a pH between 5 and 10; and wherein at least one of the zinc ion and/or carbonate source is progressively made available to the solution at a precipitation limiting rate.

The above-defined method is in contrast to prior art methods in which a high pH solution of all the precipitant ions (with the zinc as zincate) is caused to precipitate by lowering of the pH. The present invention avoids the production of undesirable high pH artifacts such as microprecipitates of ZnOH, which can act as seeds for the uncontrolled growth of zinc carbonate complexes, by initially setting the pH of the mother liquor. In this fashion, high quality, substantially uniform metastable complexes can be reproduceably precipitated with sizes and morphologies which possess interesting Theological properties.

Zinc oxide particles produced according to the procedure described herein are ultrafine precipitates of controlled size and morphology produced by the above method and defining substantially homogeneous populations of rods with a narrow diameter and aspect ratio distribution.

The precipitate which forms as a metastable mixed complex of zinc, or zinc and some other cation such as ammonium or a dopant, and hydroxy, bicarbonate, carbonate or oxalate, etc., may be recovered as the salt by conventional techniques or alternatively must be calcined to produce zinc oxide particles. The calcination temperature will depend to some extent on the exact nature of the carbonate moiety but the metastable nature of the precipitate will generally allow the use of comparatively low calcination temperatures in comparison with classic carbonate decomposition. For instance, calcination temperatures as low as 250°–340° C., perhaps even 200° C. are achievable in comparison to the 400°–800° C. required in classic carbonate calcinations. Oxalates and other bicarboxylate metastable precipitates may even require lower calcination temperatures, such as 120° C.

The precipitates formed by the procedures described herein are metastable and therefore prolonged contact with the chemically reactive environment of the mother liquor will tend to cause maturing or ripening. Prior to physical separation of the precipitate, it can be isolated, to some extent, from its chemical environment. For instance, manipulation of the dissolved carbon dioxide concentration can delay ripening in solution, prior to filtration or centrifugal separation. The precipitates are not water sensitive, unlike the prior art zincate precipitation techniques, e.g., of U.S. Pat. No. 5,132,104, which require washing of the separated precipitate in polar organic solvents such as acetone or ethanol.

Suitable separation techniques can include an initial surface charge neutralization step of coating the surface of the precipitate suspension with a surfactant such as methaorylate followed by spray-drying. Calcination of the resultant particles will tend to volatilise any surfactant residues remaining after the spray drying operation.

Spray roasting, in which the precipitate containing solution is sprayed into a heated chamber at temperatures approaching 270° C. can simultaneously effect dewatering and calcination. Filtration, leading to a more densely packed arrangement can also be used, optionally in conjunction with surfactant based redispersion techniques.

The expression 'carbonate source' includes carbonates, bicarbonates, oxalates, malates, succinates and also carbon dioxide introduced into the aqueous solution as a gaseous phase or evolved in situ through dissolution or decomposition. Ammonium salts are preferred especially when the resultant zinc oxide is intended for applications in which metal ion contamination should be avoided, such as electrostatic applications.

Preferred zinc salts to produce the aqueous zinc solution include the nitrate, sulfate and chloride. The solution may be pure water or a mixture of water and another miscible or immiscible solvent such as an alcohol or acetonitrile.

Control of the relative availability of carbonate to zinc ion concentration within the aqueous solution can be simply achieved by the gradual addition of the carbonate source and/or zinc ion, in solid but preferably dissolved form, to the aqueous mother liquor. Alternatively, the reagents can be added in a form which decomposes to release and make available zinc ion or the carbonate source. For example, urea or ammonium carbamate can release carbon dioxide in a retarded fashion to ensure a suitably low reactive concentration. Metal chelators such as the EDTA family can maintain a low reactive zinc ion concentration in the aqueous solution. When carbon dioxide is used as the carbonate source it is convenient to bubble it through the aqueous solution, optionally in conjunction with a solubility regulator such as ammonia.

Control of the pH within the above defined range is advantageously carried out with dilute reagents such as 0.05 to 0.25M KOH or NaOH, in conjunction with vigorous mixing. The preferred pH control agent is ammonium hydroxide, such as a 5–10% ammonia in distilled water solution. The ratio of ammonium to carbonate source will generally be lower, for instance approaching unity compare with prior art methods, which may lead to enhanced metastability in the precipitated complexes.

Appropriate control of the relative availability of the various ions allows control of the aspect ratio of the resultant precipitant. Generally speaking, within the above-defined process conditions, the slower the rate of reactant addition, the greater is the aspect ratio, i.e. the length of the rods. Conversely, increasing the addition rate will decrease the aspect ratio; however, too rapid an addition will lead to the non-homogenous particle size distributions displayed by prior art techniques. Addition rates will vary with the strength and solubility of the reagents, but as a guide, for a 0.5 molar concentration of zinc ion, an addition rate between 0.5 and 2.0 liters/hour for a 0.4 molar equivalent carbonate source has been workable. It should, of course, be recognized that the hydrodynamics of the solution influence the intended morphology. In particular, in contrast to conventional crystal deposition techniques, high aspect ratios will demand effective mixing, even with relatively dilute reagents to avoid localized regions of aberrant reactant concentration.

The actual hydrodynamic conditions employed during precipitation will depend on reactor size, geometry, number of baffles, etc., but generally speaking will be as high as possible without inducing cavitation or other admission of air bubbles into the system. As a guide, a Reynolds number of at least some hundreds, preferably 8000 and above, will be appropriate for many systems.

The procedures described herein allow for doping of the zinc precipitate complex and any zinc oxide end products through co-precipitation of the zinc precipitate with a dopant such as yttrium, aluminum, gallium, platinum, bismuth, a lanthanide, curium, molybdenum, nickel, cobalt, antimony, chromium or other group III–VII compound. Doping can assist the semiconductor, catalytic or photoelectric properties of the particles. Typically 0.01 to 10% of the resultant particles will comprise the dopant oxide.

Co-precipitation can be performed simultaneously with formation of the zinc oxide to produce homogenous particles. The respective concentrations of dopant oxide to zinc oxide in the end product can be controlled through adjustment of their respective reagent concentrations in the mother liquor during precipitation.

Alternatively, doping can be performed sequentially by first forming a zinc carbonate core and then precipitating one or more layers of dopant over the core. The end product powders will than have the dopant on the zinc interface with very little solubility in the solid phase.

Doped particles of controlled size and morphology have many uses in the electronic and electroconductive fields. Populations of the particles, as spheres which are then fused into rods, or as rods, can be tailored for specific roles, as described herein.

An electroconductive composition may comprise a polymer substrate or base having the particles incorporated therein, typically in an amount corresponding to 1.0 to 90 wt % or more preferably 20–70% or 30–50% by weight. Higher aspect ratios are generally preferred to enhance interparticle contact and thereby electrical conductivity. The elongate shape and ultrafine size of the present particles leads to good dispersability of the particles within the substrate allowing smaller quantities of the particles to be used in comparison to prior art electroconductive compositions.

The particles used in these electroconductive roles are preferably those produced by coprecipitation of the dopant metal, but may also be formed from the earlierdescribed controlled morphology particles which have been surface doped by conventional techniques.

Preparation of Zinc Oxide Sphere

Zinc oxide spheres are prepared and then fused into a rod shape zinc oxide particle, as described below.

Referring initially to FIG. 1, this procedure includes the steps of forming an aqueous solution of a zinc ion, followed by pH and temperature adjustment. A gaseous carbon dioxide stream is introduced to the zinc solution while a pH and temperature feedback loop maintains precise control over the reaction environment. A precipitate comprising a mixed complex of zinc and hydroxide, bicarbonate and carbonate forms as the carbon dioxide is fed in. The metastable precipitate is separated from the mother liquor which is temperature treated to reform the reagents. The precipitate can be low temperature calcined to form an ultrafine ZnO powder of defined particle size and morphology to form a mixed complex of zinc and hydroxides, bicarbonates and carbonate.

In this procedure, the reactor comprises a 2 liter cylinder equipped with vertically extending baffles around its circumference. Stirring was achieved with a central impeller which was speed governed to within 1% of the nominal rpm. Reagent addition to the reactor was via glass conduits opening into the reactor adjacent the impeller, thereby assuring instant mixing. Gaseous reagents were added via microporous sintered glass tips again adjacent the impeller.

A central microprocessor received input form pH, temperature and ion-selective probes mounted in the reactor and controlled peristaltic reagent input pumps and high precision reagent input valves. Bulk reagent vessels were equilibrated to the intended reaction temperature.

68.14g of 99.81% pure ZnCl (Sigma Chemical Co., St. Louis, Mo.; Aldrich Chemical Co., Milwaukee, Wiss.) was dissolved in 1.5 liters of distilled water and fed into the reactor. The temperature was reduced to 22° C. and maintained within a degree of this temperature, throughout the experiment. Stirring was set to 175 rpm. The pH was controlled with an ammonium solution comprising 8% ammonia in distilled water which was very gradually added to the stirred solution so as to avoid localized pH perturbation. The pH was maintained in this fashion within the range 9.5–10 throughout the experiment.

A carbonate source comprising carbon dioxide gas 0.1% (balance oxygen and nitrogen) was introduced to the solution at approximately 4.0 l/h. The precipitate formed instantly and the carbon dioxide inflow was continued until an appreciable amount of precipitate was dispersed in the reactor.

The precipitate was washed in distilled water and dried. The powder was X-ray amorphous. The powder was calcined at 270° C. for 3 hours to form a white powder of submicron particles with a narrow size distribution and with a density of around 5.6 g/cm and surface area of 35 m/g.

Figure 2:
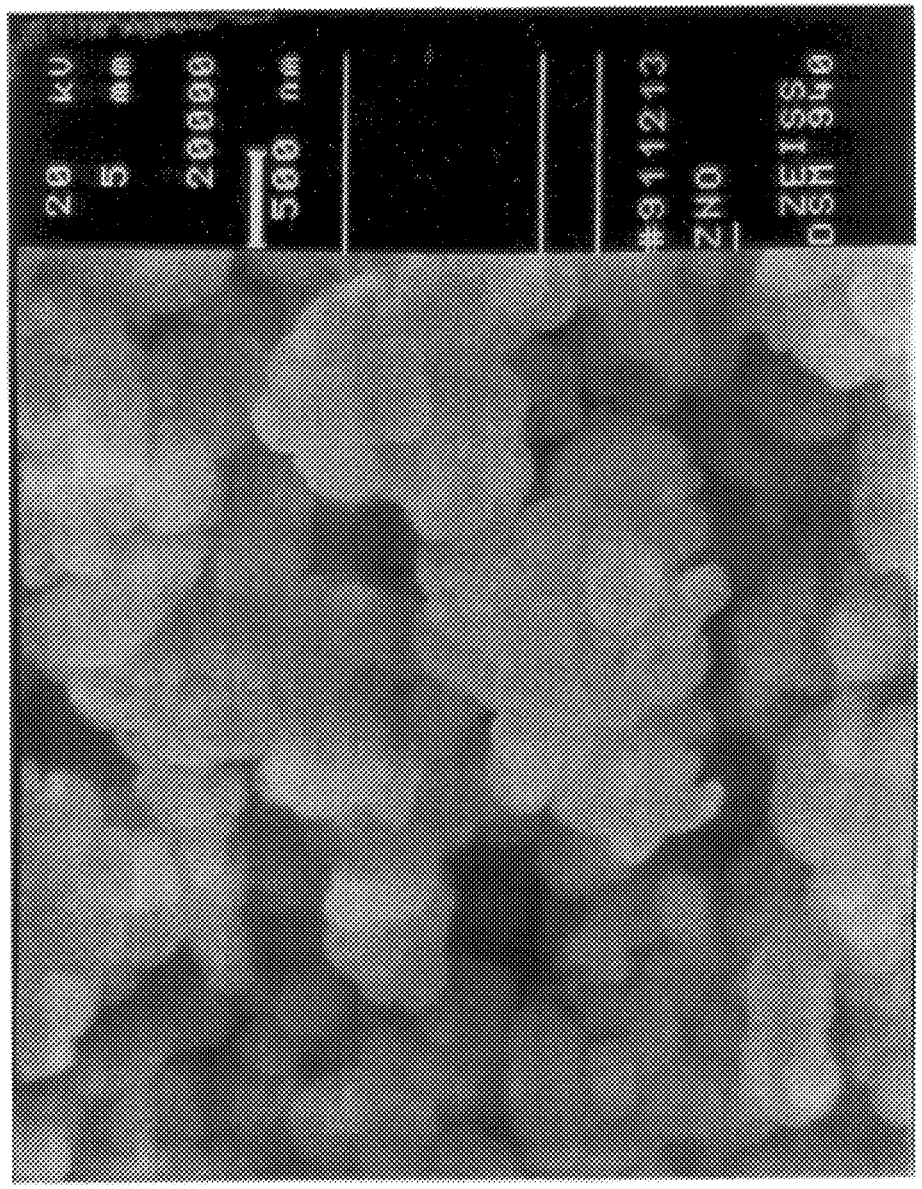
FIG. 2 is a scanning electron micrograph of spherically shaped zinc oxide particles.

The powder was prepared for scanning electron microscopy by the gold coating method. As can be seen from the micrograph of FIG. 2, these process conditions produced a sphere morphology with a diameter between 50 and 150 nm.

Referring once again to FIG. 1, process refinements can include the recycling of the ammonia component, heat separated from the mother liquor after removal of the precipitate, back to the pH adjustment step, marked with the letter A in FIG. 1. Additionally or alternatively, the liquid from this ammonia recovery step can be treated to recover the solvent which can also be recycled to provide a virtually closed environmentally friendly system ("B" in FIG. 1).

Preparation of Shorter Zinc Oxide Rods

The apparatus described above was charged with 1.5 l of distilled water. Stirring, temperature and pH control were also as above.

Aqueous 0.3M zinc chloride and 0.2M ammonium bicarbonate solutions were simultaneously added to the reactor via separate conduits at a respective rate of 0.5 l/h and 0.5 l/h. The resultant precipitate was separated as above.

Figure 3:
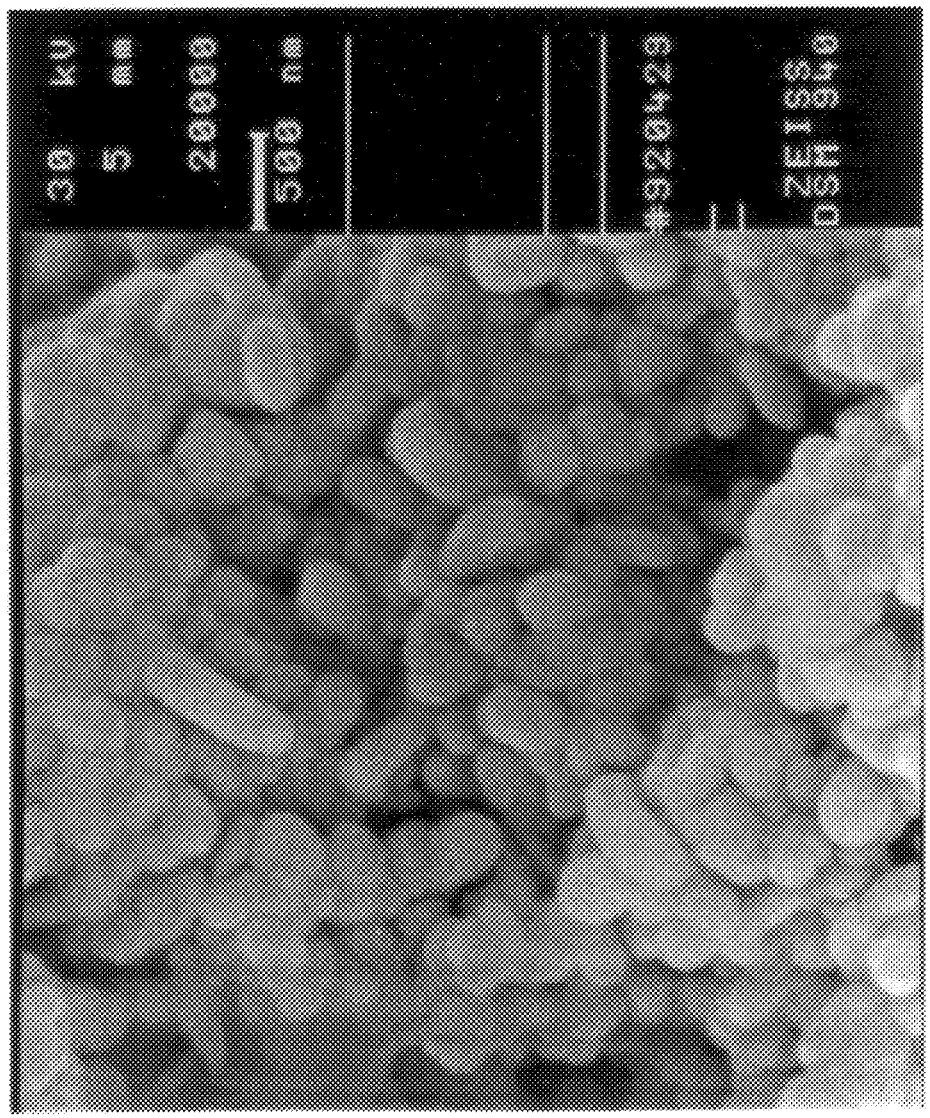
FIG. 3 is a scanning electron micrograph of rod shaped zinc oxide particles.

Calcination of the resultant precipitate was at 250° C. for 3 hours. FIG. 3 shows the resultant zinc oxide particles which display a rod morphology with diameters between 50 to 100 nm and lengths between 100 to 200 nm.

When carbon dioxide is used as the precipitant, an additional recycling possibility is to collect carbon dioxide from the calcination step for use as the precipitant, as shown with dotted lines on FIG. 1.

Preparation of Longer Zinc Oxide Rods

In the system described for the preparation of zinc oxide rods, but with a stirring speed of 200 to 250 rpm, 0.3M zinc chloride and 0.1M carbamate solutions were simultaneously added to the reactor through respective glass conduits at respective addition rates of 0.5 and 0.7 l/h. Carbamate is stable in solution but breaks down via metal catalysis to liberate reactively available carbon dioxide and ammonia in solution.

Figure 4:
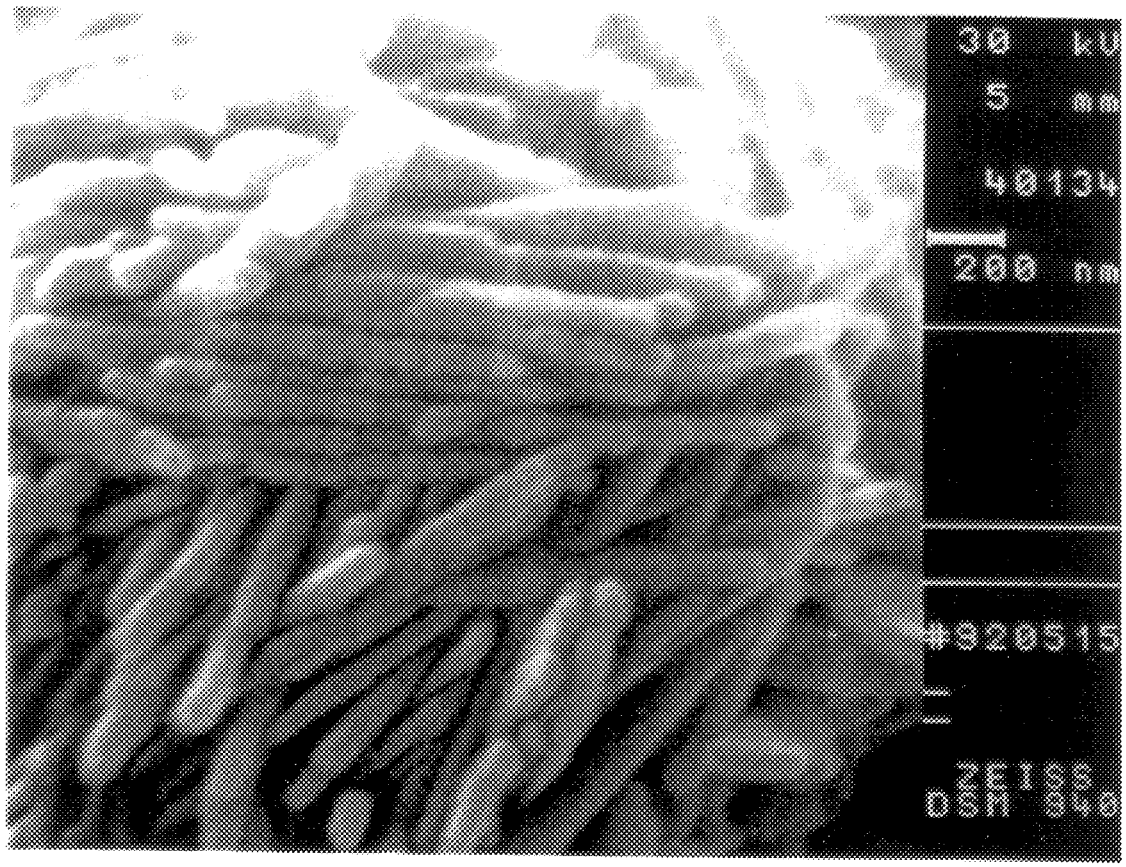
FIG. 4 is a scanning electron micrograph of fiber shaped zinc oxide particles.

The resultant precipitate was separated and prepared for SEM as above. These process conditions produced a longer rod shaped morphology, as shown in the micrograph in FIG. 4. The rods display an homogenous size distribution between 10 to 50 nm in diameter and 50 to 500 nm in length.

Preparation of Zinc Oxide via the Oxalate Route

In the reactor conditions described in preparation of zinc oxide rods, above, but with the stirring speed within 150 to 175 rpm, 0.2M zinc chloride and 0.1M oxalic acid were simultaneously added to the reactor at respective rates 0.5 and 0.8 l/h. The precipitate was recovered as described in the rod preparation above, but at a calcination temperature of 125° C. Electron microscopy of the resultant powder showed spherical particles with diameters within the range 50 to 150 nm. Rod morphologies can also be deposited using this reagent system.

Preparation of Doped Zinc Oxide Particles

Figure 5:
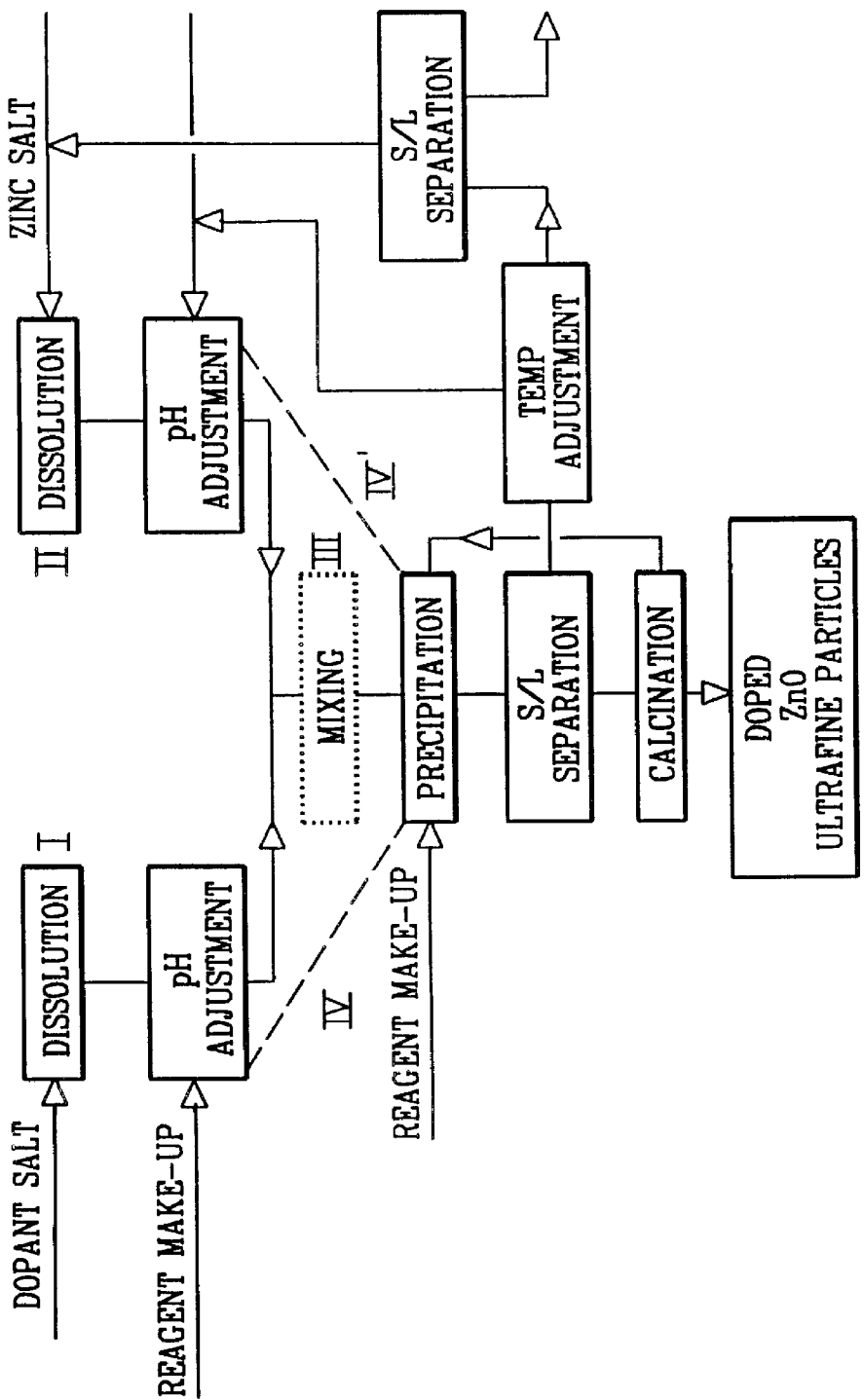
FIG. 5 is a flow diagram of a second process for producing zinc oxide particles as described herein.

Referring now to FIG. 5, a scheme for the production of doped zinc oxide particles is shown. In this scheme, two separate metal solutions, the first a zinc ion solution (I, at the top, left) and the second a dopant metal ion solution (II, top, right) are prepared and separately pH and temperature adjusted.

In a first process variant leading to an homogenous dopant/zinc precipitate, the respective metal ion solutions are mixed (III) and introduced to the mother liquor together. In this fashion, the resultant precipitate complex comprises an intimate co-precipitate of dopant and zinc, the proportion of both reflecting their respective concentrations in the mixed input stream. As with the earlier described procedures, pH and temperature feedback loops (IV, IV') can be provided to maintain optional reaction conditions during the precipitation, in particular when it is desired to take account of the differing solubilities of zinc and dopant metal ions at different pHs to assist in regulating proportionality of deposition of the respective metals.

In a second process variant the mixing of metal ion solutions I and II is avoided and the respective solutions are admitted to the reactor sequentially. The resultant precipitate comprises an initially precipitated zinc complex core surrounded by a layer of dopant ion complex. Again, the pH control of the respective metal solutions may take advantage of the differing solubilities of the respective metals at different temperatures.

In each case, the respective precipitates are separated and calcined in similar fashion to the above described procedures to produce doped ZnO particles of defined size and morphology.

Preparation of Zn/Bi Coprecipitate

A first process variant of the preparation of doped zinc oxide particles was used to produce a mixed coprecipitate of metastable Zn and Bi carbonates.

The reactor system described above in the preparation of zinc oxide particles, as shown in FIGS. 1 and 5, was charged with distilled water and the pH initially adjusted to 8–11 with dilute ammonia solution. A first solution was prepared by mixing 0.3M $ZnCl_2$ and 0.01M $Bi(NO_3)_3$ in the ratio 3:1, the ratio being adjusted with reference to the desired composition of the end product oxide. A second solution comprised 0.1M $NH_4HCO_3$.

The first and second solutions were added dropwise to the aqueous system and the pH carefully maintained at the initial value by dropwise addition of the dilute ammonia solution during vigorous agitation. A composite consisting essentially of metastable zinc and bismuth carbonates was coprecipitated and calcined to obtain a very homogenous mixture of ZnO and $Bi_2O_3$ having the above defined particle size and distribution.

A variant of this process uses a dual dopant oxide solution, in particular with a solution of Bi and Sb to produce a trimetal coprecipitate.

Preparation of $ZnO/Al_2O_3$ Coprecipitate

A second process variant of FIG. 5 was used to produce a coprecipitate of ZnO and $Al_2O_3$ suitable for electronic applications.

The water charged reactor system described in the above description of the preparation of zinc oxide particles was pH adjusted to between 8 and 10. With reference to FIG. 5, a zinc core precipitate was first produced by dropwise addition of a solution II consisting of 0.3M $ZnCl_2$ and a separate carbonate source solution comprising 0.1M $NH_4HCO_3$. The pH was controlled via the feedback loop with small additions of dilute ammonia to the vigourously agitated aqueous solution.

Referring again to FIG. 5, solution I comprised 0.1M $AlNO_3$ which was subsequently precipitated onto the suspended zinc precipitate core. Calcination of the mixed precipitate provided a uniform powder of biphase aluminium oxide on zinc oxide appropriate for semiconducting roles, for example, conventional compression sintering to form varistors.

This reagent system can also be used in the process variant of the Zn/Bi coprecipitate preparation described above, for example, at a 5:1 ratio of the Zn:Al solutions to form a homogenous coprecipitate.

The zinc oxide rods described herein may be combined with any polymer to produce a conductive polymer as described herein. A metastable zinc ion precipitate, as described above, is combinable with the polymer in a manufacturing process, examples of which are described below.

Preparation of Plastic Conductive Polymers

The invention encompasses conductive polymers made of plastic, which may be made using plastic preparative procedures known in the art, several of which are described below.

Methods which are known for preparing antistatic plastic films include incorporation of the zinc oxide rod particles into the plastic film, and application of a surface coating of a vehicle containing the zinc oxide rods onto the plastic film.

Rods may be applied to a surface by a number of methods known in the art, which include coating of a polymer containing the zinc oxide rods onto a surface as an antistatic layer. Polymeric substances and surface active agents which can be used in antistatic coating methods are described in detail in Hideo Marumo. *Taidenboshi Zai* (*Antistatic Agents*), Saiwai Shobo, Tokyo, hereby incorporated by reference.

Conductive polymers useful in the invention include but are not limited to polymers which form plastic, e.g., monomers, oligomers and polymers, containing a vinyl or vinylidene group. Examples of such monomers containing a vinyl or vinylidene group include styrene and its compounds, e.g., α-methylstyrene and β-chlorostyrene, acrylic acid and methacrylic acid and their compounds, e.g., alkyl acrylate (alkyl group: containing 1 to 4 carbon atoms), alkyl methacrylate (alkyl group: containing 1 to 4 carbon atoms), glycidyl acrylate, glycidyl methacrylate, ethylene diacrylate, diethylene glycol diacrylate, ethylene dimethacrylate, glycerol trimethacrylate, pentaerythritol tetramethacrylate, aryl methacrylate, and aryl acrylate, vinyl acetate, acrylonitrile, methacrylonitrile, itaconic acid, maleic anhydride, acrylamido diarylphthalate, and diaryl fumerate.

Preferred examples of oligomers and polymers are compounds containing a double bond or bonds in the main chain thereof or compounds containing an acryloyl or methacryloyl group at both ends of the straight chain. These compounds are referred to in A. Vrancken, Fatipec Congress, 11, 19 (1972), hereby incorporated by reference. Other preferred examples of polymers are compounds containing an acryloyl group at both ends of the straight chain.

Other polymers useful in the invention include but are not limited to thermoplastic polymers, for example, polyamides, such as nylon-6, nylon-11, nylon-12, nylon-66, nylon-610, nylon-612, etc., polyesters, such as polyethylene terephthalate, polybutylene terephthalate, polyethylene oxbenzoate, etc., polyolefins, such as polyethylene, polypropylene, etc., polyethers, such as polymethylene oxide, polyethylene oxide, polybutylene oxide, etc., vinyl polymers, such as polyvinyl chloride, polyvinylidene chloride, polystyrene, etc., polycarbonates, and copolymers and mixtures consisting mainly of these polymers. Solvent soluble polymers include acrylic polymers containing at least 85% by weight of acrylonitrile, modacrylic polymers containing 35–85% by weight of acrylonitrile, cellulose polymers, such as cellulose, cellulose acetate, vinyl alcohol polymers, such as polyvinyl alcohol and saponified products thereof, and polyurethane, polyurea, and copolymers or mixtures consisting mainly of these polymers.

Polymers having crystallinity of not less than 40%, particularly not less than 50%, more preferably not less than 60% are preferable. The above described polyamides, polyesters and acrylic polymers have crystallinity of about 40–50% and, as the polymers having crystallinity of not less than 60%, mention may be made of polyolefins, such as crystalline polyethylene, crystalline polypropylene, polyethers, such as polymethylene oxide, polyethylene oxide, etc., linear polyesters, such as polyethylene adipate, polyethylene sebacate, polycarprolactone, polycarbonates, polyvinyl alcohols, cellulose and the like. Suitable crystalline polymers also include polymers of one or more olefins, particularly polyethylene, copolymers of at least one olefin and at least one monomer copolymerizable therewith such as ehtylene/acrylic acid, ethylene/ethyl acrylate, and ethylene/vinyl acetate copolymers, melt-shapeable fluoropolymers such as polyvinylidene fluoride and ehtylene/tetrafluoroethylene copolymers, and blends of two or more such polymers.

Conductive polymers of the invention are generally made by dispersing zinc oxide particles having a substantially rod shape in a compound containing an unsaturated bond capable of undergoing polymerization or a binder containing the polymerizable compound. Where the desired form of the polymer is a plastic film, further steps may be performed which include dispersing the zinc oxide-containing compound on a plastic film to form at least one layer and polymerizing and curing the layer. Alternatively, the zinc oxide rods may be dispersed in a binder, and after addition of the polymerizable compound to the resulting disperson, then coated on a plastic film. It is preferred that the zinc oxide particles are dispersed in the polymerizable compound.

Any polymers normally used in coating can be used as the binder. Examples include cellulose esters, e.g., cellulose acetate, cellulose nitrate, cellulose acetate butyrate, and cellulose propionate, soluble polyesters, polycarbonates, soluble nylons, polyvinyl chloride, vinyl chloride-containing copolymers, polyvinylidene chloride, vinylidene chloride-containing copolymers, polystyrene, styrene-containing copolymers, polyvinyl acetate, vinyl acetate-containing copolymers, and alkyl acrylate-containing copolymers (alkyl group: containing 1 to 4 carbon atoms).

Solvents for these polymerizable compounds and these binders include ketones, e.g., acetone, methylethyl ketone, methyl isobutyl ketone, and cyclohexanone, ethers, e.g, methyl acetate, ethyl acetate, butyl acetate, ethyl lactate, and acetic acid glycol monoethyl ether, glycol ethers, e.g., glycol dimethyl ether, glycol monomethyl ether, glycol monoethyl ether, and dioxane, aromatic hydrocarbons, e.g., benzene, toluene and xylene, chlorinated hydrocarbons, e.g., methylene chloride, ethylene chloride, chlorothene, and trichlene, alcohols, e.g., methanol, ethanol, propanol, and butanol, dimethylformamide, dimethylsulfonamide, and phenol.

The volume ratio of the zinc oxide rods/binder plus polymerizable compound is preferably from 10/1 to 1/6 and more preferably from 8/1 to 1/2. Of course, this range varies depending on the type and composition of the plastic film, and the size of the zinc oxide rods. The weight ratio of binder to polymerizable compound is preferably from 8/2 to 0/10.

The composition in which the zinc oxide rod particles are dispersed may be supplemented by adding a sensitizer, a slipping agent, a dispersant, etc. Preferred sensitizers include compounds represented by the following formulae: phenyl-CO—CHOR-phenyl, where R is an alkyl group containing 2–8 carbon atoms, or phenyl-CO—CCl$_3$, or phenyl-CO-phenyl, or phenyl-CO—COCH$_3$(OCH$_3$)-phenyl. The amount of the sensitizer added is preferably from 3 to 20% based on the total weight of the polymerizable compound and the binder. Of course, it varies depending on the amount of zinc oxide rod particles added.

Preferable slipping agents include saturated or unsaturated higher aliphatic acids, aliphatic acid amides, and silicone oil. Preferred examples of disperants include titanium coupling agents, silane coupling agents, lecithin, and amido compounds.

Preferred plastic films include but are not limited to: polyesters, e.g., polyethylene terephthalate and polyethylene naphthalate, polyolefins, e.g., polyethylene and polypropylene, cellulose esters, e.g., cellulose triacetate, cellulose diacetate, cellulose acetate propionate, cellulose acetate butyrate, and cellulose nitrate, vinyl-based plastics, e.g., polyvinyl chloride, polyvinylidene chloride, and polystyrene, polycarbonate, polyimide, polyamidoimide, polycarbonate, or the like.

The dispersion composition layer as described above can be provided on the plastic film by various techniques such as blade coating, air knife coating, gravure coating, rod coating, reverse roll coating, spray coating, and transfer roll coating. These techniques are described in detail in Yuzi Ozaki, *Coating Engineering*, Asakura Shoten, Tokyo; the gravure coating is described in detail in G. E. Booth, *Coating Equipment and Process*, Lockwood Publ, Co. Inc. (U.S.), both of which are hereby incorporated by reference.

Radiations which can be used for polymerization and curing include electron rays, ultraviolet rays, X rays, and γ rays. Chemical polymerization or heat polymerization are also within the invention.

As an electron ray accelerator for use in irradiation with electron rays, a Van de Graf type scanning system, a double scanning system, and a curtain beam system can be used. It is preferable to use a curtain beam system which is relatively inexpensive and can produce a large output. With regard to electron ray characteristics, the acceleration voltage is usually from 100 to 1,000 kV and preferably from 150 to 300 kV. The adsorbed dose is usually from 0.5 to 300 kV. The adsorbed dose is usually from 0.5 to 20 Mrad and preferably from 2 to 10 Mrad.

Irradiation with electron rays is described in detail in J. Silverman and A. R. Van Dyken, *Radiation Processing*, (1977), hereby incorporated by reference.

Apparatuses and conditions for irradiation with ultraviolet rays are well known in the art. It is preferable to use ultraviolet light falling within the range 200 to 400 nm.

To prepare a conductive plastic polymer according to the invention, the zinc oxide rod particle dispersion composition is coated, dried, and then irradiated with radiation to obtain the desired plastic film which is substantially transparent. The resulting film will have excellent scratch resistance, abrasion resistance, and antistatic properties.

When the plastic film of the invention is used as a support for photographic light-sensitive materials, the surface treating method, light-sensitive compositions, and so forth are not subject to any special limitations, and can be determined by referring to the description in *Research Disclosure*, Vol. 185, pp. 22–31 (December 1978), hereby incorporated by reference.

In the preparative examples described below, all parts are by weights.

Approximately 1 gm of zinc oxide rods, prepared as described above, is placed in an insulative cylinder having an inner diameter of 1.6 cm, and while applying a pressure of 1,000 kg/cm$^2$ from the bottom and top thereof by the use of a stainless steel electrode, the specific volume electric resistance of the powder is measured. The thus-prepared powder is used to prepare a dispersion in a ball mill. The dispersion has the following composition: 150 parts of zinc oxide powder, 20 parts of urethane-based acrylate (prepared in the same manner as in Example 1 of U.S. Pat. No. 4,092,173, hereby incorporated by reference), 10 parts of diethylene glycol diacrylate, 5 parts of methyl acrylate, and 300 parts of methyl ethyl ketone. The dispersion is coated on a 100 micron thick cellulose acetate support in a dry thickness of 2 microns, and the resulting coating layer is dried. After the layer is dried, radiation is applied at an acceleration voltage of 200kV and a beam current of 10 mA so that the absorbed dose will be 5 Mrad.

The thus-prepared film is substantially transparent and will exhibit high abrasion resistance, even when the relative humidity is lowered to 10% while maintaining the temperature at 25° C.

Another preparation method for conductive plastic polymer films is to combine 10 parts of the zinc oxide rod-based powder described above with 15 parts of the urethane-based acrylate powder described above, 5 parts hexanediol discrylate, 10 parts of butoxyethyl acrylate, 290 parts of methyl ethyl ketone, and 10 parts of phenol. A dispersion of this composition is coated on a 100 micron thick polyethylene terephthalate support by the use of a doctor blade so that the dry thickness will be 3 microns, and dried. Then, radiation is applied at an acceleration voltage of 200 kV and a beam current of 10 mA so that the absorbed dose will be 5 Mrad.

Another example of a conductive plastic polymer film according to the invention is as follows: 75 parts acryl-based oligomer, 300 parts of zinc oxide rod powder as above, 100 parts methyl ethyl ketone, and 6 parts benzoyl ethyl ether (trade name, Aronix; produced by Tos Gosei Chemical Industry Co., Ltd.). A dispersion containing this composition is coated on a polyethylene terephthalate film which is undercoated with a vinylidene chloride-based latex so that the dry thickness will be 5 microns, and dried. The thus-prepared coating film is placed at a distance of 10 cm below a 80/W/cm high pressure mercury lamp and irradiated in a nitrogen atmosphere for 1 minute.

Yet another example of a conductive plastic polymer film according to the invention is as follows. A mixture containing 100 parts zinc oxide rods, 5 parts of a 10% aqueous solution of $Al(NO_3)_3 \cdot 9H_2O$, and 100 parts water is subjected to supersonic wave vibration for 20 minutes to prepare a uniform dispersion. The dispersion is dried at 110° C. for 2 hour and, thereafter, was burned at $1 \times 10^{-4}$ Torr and 600° C. for 5 minutes. These particles are pulverized in a ball mill to provide particles having a mean grain size of 0.7 microns. A film was prepared in the same manner as above. The thus-prepared film will be substantially transparent and will exhibit excellent abrasion resistance.

The thus-prepared films may be tested for their ability to withstand scratching, according to the following method. The surface of the film is scratched with a diamond needle having a tip end diameter of 0.2 mm at a pressure of 15 g, and the extent of scratch is estimated by direct visual observation. The surface of a film prepared using the conductive zinc oxide rod-containing polymer of the invention will be resistant to scratching in comparison to a similar surface which lacks the zinc oxide rod film coating.

Preparation of Conductive Rubber Polymers

Conductive rubber polymers of the invention include any type of rubber which is combinable with zinc oxide particles having a substantially rod shape so as to give an antistatic rubber product. One example, conductive silicone rubber compositions, is described in detail herein.

Conductive silicone rubber compositions of the invention may contain from 1% to 90% (based on total material weight) of zinc oxide rod-shaped particles, prepared as described above, and silicone rubber, e.g., in the form of silicone gum. Conductive silicone rubber according to the invention may include such polymers as methyl vinyl polysiloxane and dimethyl vinyl siloxane; Dow Corning Limited X42638 is one example of a suitable silicone rubber. Other rubbers useful in the invention include but are not limited to homopolymers of a conjugated diene, such as those of 4 to 8 carbon atoms per molecule for availability, or copolymers thereof with a monovinyl aromatic hydrocarbon such as those of 8 to 12 carbon atoms per molecule. In the case of copolymers, the proportion of conjugated diene should be sufficient to maintain the elastomeric character of the copolymer which can be of a random, random block, block, linear, tapered, or radial character. Typical of the conjugated dienes are 1,3-butadiene, 2,3-dimethyl-1-1,3-butadiene, 2,4-hexadiene, and the like, presently preferred being butadiene and isoprene. Typically of the monovinylarenes are those such as styrene, alkylstyrenes, vinyltoluene, and the substituted styrenes such as methylstyrene, and the like. These polymers all can be readily prepared by means known in the art by solution or in appropriate cases by emulsion polymerization procedures. The rubbers can be oil-extended, if desired. Natural rubbers are also suitable, and should be included in the broad term of "rubber" as used herein. Typical of the natural rubbers are polymers of the character of "cis-1,4-polyisoprene," such as the standard Malaysian rubbers, Heveaplus MG rubbers, oil-extended natural rubbers, and the like. Other monomeric components can be utilized in preparing useful cross-linkable elastomers. Other elastomers include such as butadiene-isobutylene copolymers, acrylonitrile-butadiene copolymers, acrylonitrile-butadiene-styrene terpolymers, ethylene-acrylic elastomers, amorphous ethylene/propylene rubbery copolymers, vinylacetate-ethylene copolymers, chlorinated polyethylene rubber, and the like. The term "elastomer" (rubber) is used in a broad sense to include vulcanizable and cross-linkable materials which can be cured. Those polymers with sufficient residual unsaturation can be sulfur-cured or peroxide-cured, and those with substantially saturated character can be peroxide cured, as is known in the art.

The rubber compositions may or may not contain conductive carbon black, or if carbon black is present, less carbon black will be required in compositions of the invention. Carbon black-containing rubbers of the invention include the following. The silicone rubber may be an approximate 50/50 mixture of two silicone rubbers produced by Dow Corning Limited and known as Q41602 and X42638 rubbers which comprise dimethyl vinyl siloxane incorporating 55% of Shawinigan carbon black with a platinum catalyst. The precise proportion of the rubbers is adjusted so that the final material has a desired conductivity by taking samples and adding more of one of the rubbers to adjust the conductivity.

Other rubbers which are useful according to the invention are, e.g., ICI E315/50 contaning 20% (based on the weight of rubber) of Shawinigan carbon black and a curing agent comprising 4% of Di-cumyl peroxide such as Dicup 40C (based on the weight of rubber) made by Hercules Powder Company of Wilmington, Delaware, U.S.A. can be provided. ICI E315/50 rubber comprises a methyl vinyl polysiloxane and contains, as supplied by ICI, 28% fumed silica additive together with 1–2% of structure control additive and the percentage contents referred to above are in relation to the weight of the rubber, including additive, as supplied. Alternatively, ICI rubber E303 with 6% (based on weight of rubber) of Ketjenblack EC and 4% Dicup (based on weight of rubber). ICI 303 rubber also comprises a methyl vinyl polysiloxane.

Where it is desirable to include some carbon black in the rubber mixture, e.g., for black or grey color purposes, the carbon black may be sulphur free and it is preferred to use carbon black manufactured from acetylene such as that produced by the Shawinigan Company. Alternatively, Ketjenblack EC (made by Akzo chemie Nederland by Nieuwendammerkade, 1–3 P.O. Box No. 15, Amsterdam-N) may be used, or any other carbon black or a combination of blacks.

Conductive rubber compositions of the invention are prepared as follows.

The rod-shaped zinc oxide particles are blended into the rubber phase in any suitable mixing operation known to the rubber mixing arts. Presently preferred as convenient is a roll mill operated at "full steam" which is a term understood by those skilled in the arts. Curing agents normally are added toward the end of the mixing process to avoid premature curing. Of course, minor amounts of process oils, internal lubricants, mold release agents, stabilizers, and the like, can be added at the time of blending, or can be included as a component of the rubber. It should be recognized that the rubber or elastomer itself can and normally will contain minor effective amounts of various components pre-added for a variety of requirements known in the art, such as suitable curing agents such as organic peroxides or sulfur, zinc oxide and other activators, benzothiazyl sulfenamides such as N-cyclohexyl-2-benzothiazolesulfenamide or other accelerators, processing, agents, varying amounts of process oils, plasticizers, mold release agents and/or stabilizers, since there are quite a variety of additives known and perennially used in the blending/processing/curing arts for various desirable effects.

Vulcanization of the rubber compositions includes molding at temperatures such as about 100° C. to 220° C. for periods of time ranging from about 5 minutes to several hours. Molding techniques include such as placing preshaped rubber articles into a compression mold and heating them under pressure, or injecting rubber compounds into said mold followed by subsequent heating under pressure. In addition, curing can also be accomplished by heating extruded articles with low pressure steam, a technique applied for making mechanical goods such as hoses, belts, straps and strips. Vulcanization of my inventive blends can be carried out in a compression mold at such as about 140° to 160° C. for about 20 to 40 minutes.

Conductive rubbers of the invention can be utilized for manufacturing conductive and/or semi-conductive articles including such as industrial tires, shoe soles, belts, pipes, tiles, and cove base strips. Such articles are used under conditions in which static buildup of electrical charges is undesirable. The articles can be readily prepared by molding, or extrusion, which simultaneous or with subsequent curing as may be desirable.

Another use for the conductive zinc oxide containing rubber polymers of the invention is in the form of an elongate tape having a pair of spaced parallel elongate electrodes extending longitudinally of the tape. The tape may be from 10 to 30 mm in overall width and 1 to 5 mm in overall thickness and of indefinite length. The tape may be 15 mm wide and 2.4 mm thick.

The material may be post cured by heating in an oven for 2 to 12, preferably 2 hours, at 100° to 250° C., preferably 150° C., and then at a temperature in the range 100° to 250° C., preferably 200°–250° C., for a further 2 to 8 hours, preferably 2 hours. In the case of a heating tape, an outer sheath of non-conducting silicone rubber is then applied to the tape and the thus-sheathed tape is heated to 150° to 350° C., preferably 300° C., for 3 to 5 minutes, preferably 3 minutes to cure the outer sheath. If desired, other material such as a thermo-setting or thermoplastics material may be used to sheath the tape with an appropriate curing operation as necessary. Subsequently the outer sheath is post-cured by heating the sheathed tape in an oven for 1 to 8 hours, preferably 2 hours, at 100° to 200° C., preferably 150° C., and then increasing the temperature to 150° to 250° C., for a further 1 to 8 hours, preferably 2 hours. The tape is then allowed to stand for about one week. The above procedures, although not essential, are preferable as they increase the conductivity of the material.

Alternative annealing procedures may be adopted. For example, the material may be annealed at a temperature lying in the range 100° C. to 200° C. for at least six hours and preferably between eight to twelve hours. The annealing operation may be performed cyclically, for example, by heating to a temperature in the above mentioned range for a period of time, for example, two hours, permitting the material to cool and then re-heating and repeating the cycle for 4 or 5 times. The amount of annealing required increases with the amount of zinc oxide rods present in the rubber mixture. The annealing step increases the conductivity compared with that which would be achieved without annealing. If desired, for example, when the material is used a heating tape, the material may be permitted to self-anneal, with the current on.

It is preferable to provide a more highly conductive layer of heating tape around the wires than between the wires. For example, the conductive rubber is extruded as a thin film to cover the wires. The thus-covered wires are than utilized in a further extrusion operation in which the rubber of the main body of the tape is extruded thereon. Subsequently, an outer sheath of non-conducting silicone rubber may be applied.

The heating tape may be 15 mm wide and 2.4 mm thick and may be of indefinite length, and may comprise a pair of spaced parallel wire electrodes. The wires are covered with conducting rubber to form the main body of the tape again in a conventional extrusion operation. The rubber of the main body of the tape may comprise Dow Corning Limited rubber X41638, which contains no carbon black. The rubber may contain 20–70% zinc oxide rod shaped particles, prepared as described herein, (based on the weight of rubber) having a particle size lying in the range 150 nm/50 nm.

The heating tape may be post-cured by heating in an oven for 2 hours at 150° C. and then increasing the temperature to 250° C. for a further 2 hours. An outer sheath of ICI E315/50 silicone rubber including appropriate additives and catalyst is then applied to the tape in a conventional extrusion operation and the tape is heated to 300° C. for 3 minutes to cure the outer sheath. Subsequently, the outer sheath is post-cured by heating the sheathed tape in an oven for 2 hours at 150° C. and then increasing the temperature to 250° C. for a further one to two hours. The tape is allowed to stand for one week before being used.

Comparison tests may be performed by comparing the operating resistances of the a conductive zinc-oxide rod-containing tape of the invention with a non-zinc oxide-containing non-conductive tape initially and after passage of certain periods of time. The ratio of the operating resistance to the initial resistance of the tape of the invention will be substantially constant over a period of time, whereas a tape not in accordance with the invention will have a rapid rise in the resistance over the same period.

Preparation of Conductive Adhesives

Conductive zinc oxide rod-containing adhesives (conductive die bonding agents) of the invention are particularly useful in semiconductor devices for bonding conductively the semiconductor pellet to the tab which is the attachment site and support for the pellet. Adhesives are also used to seal the semiconductor pellet which is electrically connected to a metal inner lead frame by metal wires. U.S. Pat. No. 4,721,994, which describes a tab and lead frame of a semiconductor device, is hereby incorporated by reference. The contacting of materials which differ in thermal expansivity and in response to mechanical stresses within a semiconductor device creates internal strain which can cause cracking of the materials during use. For example, stresses have been observed between materials when a silcon-based semiconductor pellet is fixed on a copper tab using a conductive adhesive. Such stresses may result in decline in performance and reliability of the device. These problems are resolvable using zinc oxide rod-containing conductive adhesives of the invention.

Conductive zinc oxide rod-containing adhesives of the invention are prepared as follows.

Any adhesive is suitable for use as a conductive adhesive according to the invention. For example, conventional epoxy resin adhesives (based on, e.g., Epon 828, Shell Chemical Corp.), polyimide resin adhesives, amino resins (based on, e.g., Cymel 325, American Cyanamid Corp.), or silicone rubber adhesives are useful.

A conductive silicone rubber adhesive may be made by combining organopolysiloxane having silicon-bonded alkenyl groups, SiH-containing organopolysiloxane, a hydrosilylation reaction catalyst and zinc oxide rod particles, and curing at room temperature or with heat. The conductive silicone rubber may include the following components: 100 parts by weight organopolysiloxane which has at least two silicon-bonded alkenyl groups in each molecule and which contains $\leq 500$ ppm low-molecular-weight siloxane with a vapor pressure $\leq 10$ mmHg at 200° C., (B) organohydrogenpolysiloxane having at least two silicon-bonded hydrogen atoms in each molecule, in a quantity such that this component furnishes 0.5 to 3 silicon-bonded hydrogen atoms per 1 silicon-bonded alkenyl group in component (A), (C) 0 to 10 parts by weight organosilicon compound which contains a functional group as represented by—SiOR$^1$ in which R$^1$ is a monovalent hydrocarbon group, and which also contains the silicon-bonded lower alkenyl group or silicon-bonded hydrogen atom, (D) A catalytic quantity of a platinum-type catalyst, (E) 0 to 100 parts by weight microparticulate silica filler, and (F) 50 to 2,000 parts by weight conductive filler.

The organopolysiloxane having silicon-bonded alkenyl groups, component (A), may include organopolysiloxane which has at least two silicon-bonded alkenyl groups in each molecule and which is representable by the following average unit formula: $R^2_a SiO_{(4-a)/2}$, where $R^2$ is a monovalent hydrocarbon group as illustrated by alkyl groups such as methyl, ethyl, propyl, and so forth, aryl groups such as phenyl, tolyl, and so forth, alkenyl groups such as vinyl, allyl, propenyl, hexenyl, and so forth; and a has a value of 1 to 3.

While this organopolysiloxane can be prepared by those methods known to the individual skilled in the art, it will generally contain as a by-product approximately 2 to 7 weight % low-molecular-weight siloxane having a vapor pressure $\leq 10$ mmHg at 200° C., such as octamethyltetracyclosiloxane, decamethylpentacyclosiloxane, dodecamethylhexacyclosiloxane, and so forth.

Organopolysiloxane comprising component (A) can be prepared by removing this low-molecular-weight siloxane from the aforementioned organopoly-siloxane, and numerous methods are available for this removal of low-molecular-weight siloxane. For example, usable methods include, inter alia, conversion of the organopolysiloxane into a thin film and stripping at 180° to 300° C. in a vacuum ($\leq 0.5$ mmHg), but also extraction of the low-molecular-weight siloxane by the addition to the organopolysiloxane of a solvent such as methanol, ethanol, propanol, butanol, or acetone. As a general matter, the organopolysiloxane comprising component (A) should have a viscosity within the range of 50 to 500,000 centistokes (cs) at 25° C., while viscosities within the range of 400 to 100,000 cs are particularly suitable.

The organohydrogenpolysiloxane comprising component (B) is a crosslinker for component (A), and should contain at least 2 silicon-bonded hydrogen atoms in each molecule. Its molecular structure may be any of linear, branched, or cyclic. This organohydrogenpolysiloxane should be admixed in a quantity sufficient for this component to furnish 0.5 to 3 silicon-bonded hydrogen atoms per alkenyl group in component (A). Quantities sufficient to provide 1 to 2 silicon-bonded hydrogen atoms are preferred. This quantity generally will not exceed 2 weight % of component (A). Furthermore, in order that component (B) contain low-molecular-weight siloxane comparable with component (A), the use is preferred of a component (B) form which the low-molecular-weight siloxane by-product has been removed, for example, by stripping at 180° C. to 300° C. in a vacuum $\leq 0.5$ mmHg.

One organopolysiloxane is exemplified as follows: $\{((CH_3)_2-SiO\}_n$, where n is an integer with a value of 2–25.

Component (C) imparts adhesiveness to the conductive adhesive of the present invention, and it comprises an organosilicon compound which contains the functional group represented by—$SiOR^1$ in which $R^1$=monovalent hydrocarbon group such as methyl, ethyl, propyl, propenyl, etc., and which also contains the lower alkenyl group or silicon-bonded hydrogen atom. Examples of this organosilicon compound are as follows: $CH_2=CH-Si(OCH_3)_3$; $CH_2=CH-Si(OC_2H_5)_3$; or $CH_2=C(CH_3)-CO-O-(CH_2)_3Si(OCH_3)_3$. Its quantity of addition should fall within the range of 0.1 to 10 parts by weight and preferably 0.5 to 3.9 parts by weight per 100 parts by weight component (A).

The platinum-type catalyst comprising component (D) is a catalyst for curing the conductive adhesive of the present invention, and usable in this regard are those generally known as addition-reaction catalysts for use in the hydrosilylation reaction. Examples here are platinum black, solid platinum supported on a carrier such as alumina or silica, chloroplatinic acid, alcohol-modified chloroplatinic acid, olefin/chloroplatinic acid complexes and platinum/vinylsiloxane complexes. The solid catalysts should be sufficiently fine-ground, or the particle size of their supports should be small enough, to give good dispersiblity, and large specific surface areas are preferred. Chloroplatinic acid and its complexes with olefin are advantageously dissolved in a solvent such as alcohol, ketone, ether, or hydrocarbon. The quantity of addition of such catalysts should be suitably adjusted so as to afford the desired curing rate. However, with regard to those catalysts compatible with siloxane, such as chloroplatinic acid and so forth, a range of 1 to 100 ppm as platinum referred to the total quantity of components (A) and (B) is preferred for obtaining a good cured product.

The microparticulate silica filler comprising component (E) is admixed in order to impart an appropriate hardness, strength, and workability to the conductive adhesive of the present invention, and it generally comprises those fillers used in addition reaction-curing silicone rubber compositions. Such microparticulate silica fillers are exemplified by fumed silica, precipitated silica, hydrophobicized silica, and so forth. It is added at no more than 100 parts by weight per 100 parts by weight component (A).

The conductive filler comprising component (F) is the essential component for imparting electrical conductivity to the conductive adhesive of the present invention. The conductive filler of the invention is zinc oxide rod-shaped particles. The zinc oxide rods may be optionally doped with other conductive fillers, e.g., micropowders of such metals as gold, silver, nickel, copper, aluminum and so forth. The zinc oxide rod conductive fillers will impart a conductivity such that the conductive silicone rubber has a volume resistivity at or below 0.1 ohm-cm. Within the context of the invention, component (F) is admixed at 50 to 2,000 parts by weight and preferably 300 to 600 parts by weight per 100 parts weight component (A).

The present invention is explained in greater detail with reference to the following illustrative examples. The viscosity reported in the examples was measured at 25° C. and "part" or "parts" are "part by weight" or "parts by weight" respectively.

The properties of the conductive adhesive may be measured according to the following methods.

1. Evaluation of Semiconductor Pellet Cracking:

The conductive adhesive is placed between a semiconductor pellet and a tab and heated for 1 minute at 200° C. After cooling, the unified assembly comprising semiconductor pellet and tab bonded via conductive adhesive, the surface of the semiconductor pellet is evaluated under a microscope for cracking.

2. Evaluation of Wire Bondability:

The aluminum bonding pads on the assembly afforded by the preceding evaluation of semiconductor pellet cracking are bonded to a copper inner lead frame by gold wires (wire bonding) to give another unified assembly. The gold wires are bonded by ultrasonic hot-press bonding. The bonding points between the gold wires and aluminum bonding pads and between the gold wires and copper inner led frame in this assembly are then inspected. The gold wires are pulled on at the same time, and defective bonding is scored when a gold wire can be lifted up. The number of defective connections is ascertained and compared to the total number of tested connections.

The unified assembly obtained in the aforementioned evaluation of wire bondability is sealed with epoxy resin in order to manufacture a semiconductor device. This semiconductor device is then heated for the specified time in saturated steam (2 atom, 121° C.). After heating, current is applied to the semiconductor device, and the leakage current across the copper inner frame is measured. The semiconductor device is scored as defective in the case of an increased leakage current and pass-through defect. The number of defects is ascertained relative to the total number of semiconductor devices.

3. Measurement of Conductivity:

A 1 mm-thick cured sheet of the conductive silicone rubber was prepared and measured using a resistivity measurement instrument (K-705RL from Kyowa Riken Yugengaisha).

Conductive adhesives of the invention include a conductive adhesive composition, optionally a rubber-based adhesive. Accordingly, when used as a conductive adhesive (conductive die bonding agent) for bonding a semiconductor pellet to the tab, in contrast to conventional conductive adhesives, there is no reduction in conductivity, wire bondability, or adhesiveness between sealant resin and semiconductive pellet surface or lead frame, and no reduction in the semiconductor device's moisture resistance. Furthermore, with regard to the bonding of the semiconductor pellet and tab with their different thermal expansion coefficients, these conductive adhesive are able to reduce changes in the properties of the semiconductor device and to prevent cracking and bending of the semiconductor pellet, which are a result of the capacity of the adhesive to absorb and reduce the stresses which develop between these two components.

Preparation of Conductive Lubricants

Conductive polymers of the invention also include any polymer which forms a lubricant and which can blend uniformly with zinc oxide rod shaped particles disclosed herein.

Lubricant-forming polymers useful in the invention include but are not limited to lubricating compositions and shaped lubricating articles, which may include 20–80% by weight of an oil of lubricating viscosity, e.g., mineral oil, diester oil or synthetic hydrocarbon oil. A shaped lubricating article is a substantially self-supporting article containing a high molecular weight polymer, made from, e.g., polyethylene or polymethylpentene in the range of about 1–5 million molecular weight, and containing 20–60% of an oil of lubricating viscosity dispersed therein. Self-supporting lubricating compositions and articles are described in U.S. Pat. Nos. 3,729,415; 3,547,819; and 3,541,011, all of which are hereby incorporated by reference.

Non-self-supporting conductive lubricants, i.e., substantially liquid lubricants are made by mixing, e.g., any commerically available lubricant with the metastable zinc oxide precipitate described herein so as to uniformly disperse the rods within the lubricant.

Conductive lubricants of the invention have many uses, several of which are disclosed herein. For example, a conductive lubricating article is useful which would be capable of releasing lubricant over a prolonged period of time under a wide variety of operating conditions, even at elevated temperatures and speeds. Self-lubricating bearings are particularly useful in the automotive, aviation, and other industries. See U.S. Pat. Nos. 3,135,564, and 3,913,992, both of which are hereby incorporated by reference.

Self-supporting conductive lubricants of the invention comprise semi-rigid gel structures, e.g., described in the prior art (above) and available commercially. Semi-rigid gels are formed as taught U.S. Pat. Nos. 3,729,415; 3,547,819; and 3,541,011 and British Pat. No. 1,173,123. In the present invention, however, about 5–50% of zinc oxide particles prepared described herein (based on the weight of the total composition), is blended with the high molecular weight polymer before it is blended with the lubricating oil and cured to form the final semi-rigid gel. Alternatively, the zinc oxide particles may be combined with the lubricating oil before it is blended with the polymer. In either case, the resultant self-supporting lubricant provides an antistatic/conductive joint in the device.

Conductive lubricants of the invention are made from synthetic hydrocarbon oils having a viscosity in the range of 13–260 mm$^2$/s measured at a temperature of 38° C. Other known lubricating oils of comparable viscosity may also be employed including the diester oils described in Military Specifications MIL-L-23699B and MIL-L-7808G. These refer to aircraft turbine engine lubricants. Products qualified under these specifications include: respectively, Exon ETO 2380 and Exon ETO 2389. Naturally occurring mineral oils may also be employed, although they tend to deteriorate at the high temperatures employed in the preparation of the new lubricating compositions. Especially preferred compositions are obtained from synthetic hydrocarbon oils having a viscosity in the range from about 25 to about 170 mm$^2$/s.

The polymeric component of the new compositions may be any high molecular weight polymer, i.e., a polyolefin having an average molecular weight in the range from about $1.0 \times 10^5$ to about $5.0 \times 10^6$, the preferred polymer being a polyethylene of average molecular weight in the range from about $2.0 \times 10^5$ to about $4.0 \times 10^6$. However, only minor proportions of polyethylene having a molecular weight of the order of $1.0 \times 10^5$ to $1.0 \times 10^6$ may be employed. Another useful high molecular weight polymer is polymethylpentene having an average molecular weight in the range from about 3 to about 5 million; see U.S. Pat. No. 4,146,487, hereby incorporated by reference.

In addition to providing antistatic properties, conductive lubricants of the invention will also be heat conductive and thus capable of conducting heat away from a bearing surface.

The conductive lubricants are prepared by first blending the high molecular weight polymer and zinc oxide particles according to conventional blending procedures. The semi-rigid gels are then prepared by simply blending the polymer-zinc oxide mixture with the oil in a conventional blender to form a physical mixture. This mixture may contain about 30 to 60% oil, about 20 to 50% polymer and about 5 to 50% zinc oxide rods, all by weight of the total composition.

The resulting physical mixture is then introduced to a mold and cured by heating it to a temperature in the range from about 325° to about 375° F., the exact temperature being selected depending on the liquid phase used. This curing temperature is maintained for a period of time (about 5 to about 75 minutes) sufficient until the mixture becomes sticky. This end point may be determined visually, by trial and error, or by testing the mixture with a metal rod to which the mixture will adhere when properly cured. The final product is then obtained by allowing the cured mixture to cool whereupon it forms a firm, tough, solid gel conforming in shape to the mold. The resulting shaped article may be shaped further by conventional means to fit any desired bearing cavity so as to assure contact of the lubricating article with the surface to be lubricated. Articles formed in this way have an oily surface provided by the exudation of oil from the semi-rigid gel.

Articles may be molded and otherwise shaped in situ so as to make them conform to the bearing cavity. Failure to completely fill a complex bearing cavity often results in undersized or incomplete lubricating articles when they are not formed in situ in the bearing, thus failing to provide full lubricating contact with the surfaces to be lubricated. Therefore, to ensure complete filling of the air-space in a bearing cavity it is preferred to mold in situ. This is particularly critical in those cases where the bearing cavity has relatively thin cross section air spaces, since thin gel structures between the rolling elements and races tend to overheat in use and reach temperatures exceeding the softening temperature of the semi-rigid gel. When this occurs, the gels break down and are expelled from the bearing with consequent failure of lubrication. However, with the semi-rigid gel compositions and articles of the present invention, which contain from about 5 to about 50% by weight of zinc oxide particles evenly dispersed throughout the gel, a gel containing any given polymer, is able to withstand a substantially higher bulk temperature and/or operating speed under operating conditions, without softening and break down, due to the dispersal of heat generated at the bearing surface.

The physical characteristics of the gels and articles of the present invention vary somewhat depending upon the identity and average molecular weight of the polymer and the proportion of polymer in the gel. Increasing the molecular weight and concentration of the polymer in the composition increases the firmness, toughness and rigidity of the gel. These characteristics are correspondingly decreased by decreasing the molecular weight and concentration of polymer in the composition. It will be seen, therefore, that by varying the molecular weight and concentration of the polymer, lubricating compositions and articles can be produced which are especially adapted for use in particular applications.

OTHER EMBODIMENTS

While the invention has been described in detail and with reference to specific embodiments thereof, it will be apparent to one skilled in the art that various changes and modifications can be made therein without departing from the spirit and scope thereof.

Other embodiments are within the following claims.

We claim:

1. A conductive polymer comprising an organic polymer and zinc oxide particles having a substantially rod shape, said rod shape comprising an elongated spherical shape, having an aspect ratio of at least 2, said particles have a length of less than about 10,500 nanometers and a diameter of less than about 3,500 nanometers.

2. The conductive polymer of claim 1 wherein said particles have a length of less than 2000 nanometers, and a diameter of less than 1000 nanometers.

3. The conductive polymer of claim 2, said particles having a length of less than 300 nm and a diameter of less than 150 nm.

4. The conductive polymer of claim 3, said particles having a length of less than 200 nm and a diameter of less than 65 nm.

5. The conductive polymer of claim 2, said particles having a length of 300 to 2000 nm and a diameter of 100 to 1000 nm.

6. The conductive polymer of claim 5, said particles having a length of 450 to 1000 nm and a diameter of 150 to 500 nm.

7. The conductive polymer of claim 1, wherein said particles comprise a dopant.

8. The conductive polymer of claim 7, said dopant comprising a metal selected from the group consisting of yttrium, aluminum, gallium, platinum, bismuth, a lanthanide, curium, molybdenum, nickel, cobalt, antimony, and chromium.

9. The conductive polymer of claim 1, said organic polymer comprising a plastic-forming polymer.

10. The conductive polymer of claim 9, said plastic-forming polymer comprising a polymer selected from the group consisting of polymers containing an alkyl group consisting of 1–4 carbon atoms, polymers containing a vinyl or vinylidene group, polymers containing a double bond in the main chain, and polymers containing an acryloyl or methacryloyl group at both ends of the straight chain.

11. The conductive polymer of claim 1, said organic polymer comprising a rubber.

12. The conductive polymer of claim 11, said rubber comprising silicone rubber.

13. The conductive polymer of claim 1, said organic polymer comprising an adhesive.

14. The conductive polymer of claim 13, said adhesive comprising a polymer selected from the group consisting of epoxy resin, polyimide resin, and silicone rubber resin.

15. The conductive polymer of claim 1, said organic polymer comprising a lubricant.

16. The conductive polymer of claim 15, said lubricant consisting essentially of a high molecular weight polymer having a molecular weight of about 1–5 million and capable of forming a self-supporting lubricant.

17. The conductive polymer of claim 16, said high molecular weight polymer comprising a polymer selected from the group consisting of polyethylene and polymethylpentene, and said conductive polymer further comprising 20–60% by weight of an oil of lubricating viscosity dispersed therein.

18. The conductive polymer of claim 17, said oil comprising an oil selected from the group consisting of mineral oil and diester oil.

19. The conductive polymer of claim 15, said lubricant comprising an oil of lubricating viscosity.

* * * * *